US012572577B2

(12) United States Patent
Dhar et al.

(10) Patent No.: US 12,572,577 B2
(45) Date of Patent: Mar. 10, 2026

(54) PRODUCTIVITY IMPROVEMENTS IN DOCUMENT COMPREHENSION

(71) Applicant: GRAPHEME INC., San Ramon, CA (US)

(72) Inventors: Vikas Bhushan Dhar, Bangalore (IN); Sridhar Sowgandharaju, Bangalore (IN); Abhijit Jayant Deo, Bangalore (IN); Ajay Nair, Bangalore (IN)

(73) Assignee: GRAPHEME INC., San Ramon, CA (US)

( * ) Notice: Subject to any disclaimer, the term of this patent is extended or adjusted under 35 U.S.C. 154(b) by 0 days.

(21) Appl. No.: 18/370,163

(22) Filed: Sep. 19, 2023

(65) Prior Publication Data

US 2024/0095268 A1 Mar. 21, 2024

(30) Foreign Application Priority Data

Sep. 19, 2022 (IN) .............................. 202241053604

(51) Int. Cl.
| | |
|---|---|
| *G06F 16/334* | (2025.01) |
| *G06F 16/3329* | (2025.01) |
| *G06F 16/338* | (2019.01) |

(52) U.S. Cl.
CPC ...... *G06F 16/3347* (2019.01); *G06F 16/3329* (2019.01); *G06F 16/338* (2019.01)

(58) Field of Classification Search
None
See application file for complete search history.

(56) References Cited

U.S. PATENT DOCUMENTS

| | | | | |
|---|---|---|---|---|
| 7,797,336 B2 * | 9/2010 | Blair | .................... | G06F 16/353 |
| | | | | 707/773 |
| 9,430,131 B1 * | 8/2016 | Zhang | ................. | G06F 3/04842 |
| 10,296,644 B2 | 5/2019 | Zhou et al. | | |
| 11,074,413 B2 | 7/2021 | Zhang et al. | | |
| 11,222,027 B2 | 1/2022 | Huh et al. | | |
| 11,256,395 B2 | 2/2022 | Sterin et al. | | |
| 2004/0098385 A1 * | 5/2004 | Mayfield | .............. | G06F 16/313 |
| | | | | 707/E17.084 |
| 2012/0131008 A1 * | 5/2012 | Ahn | ...................... | G06F 16/367 |
| | | | | 707/741 |
| 2018/0246973 A1 * | 8/2018 | Zhao | ................... | G06F 16/9535 |
| 2020/0226126 A1 * | 7/2020 | Zou | ....................... | G06N 3/084 |
| 2023/0385316 A1 * | 11/2023 | Ramamohan | ....... | G06F 16/3334 |

* cited by examiner

*Primary Examiner* — Umar Mian
(74) *Attorney, Agent, or Firm* — Shakir Law PLLC; Hassan Abbas Shakir

(57) ABSTRACT

A system and method for productivity improvements in document comprehension is disclosed. The method includes steps of receiving a query statement for retrieving a subset of documents from a set of documents and generating a query vector to determine the similarity of the query statement with the documents in the set of documents using the query vector and the document vector to generate a document similarity score. The documents in the set of documents are ranked to generate a ranked set of documents. The method further determines at least one of a query explainability score and a document explainability score and provisions a user to select at least one word from at least one from the query statement and the document, extracting the subset of document from the ranked set of documents based on the selection of the user; and displaying the sub set of document.

18 Claims, 7 Drawing Sheets

100

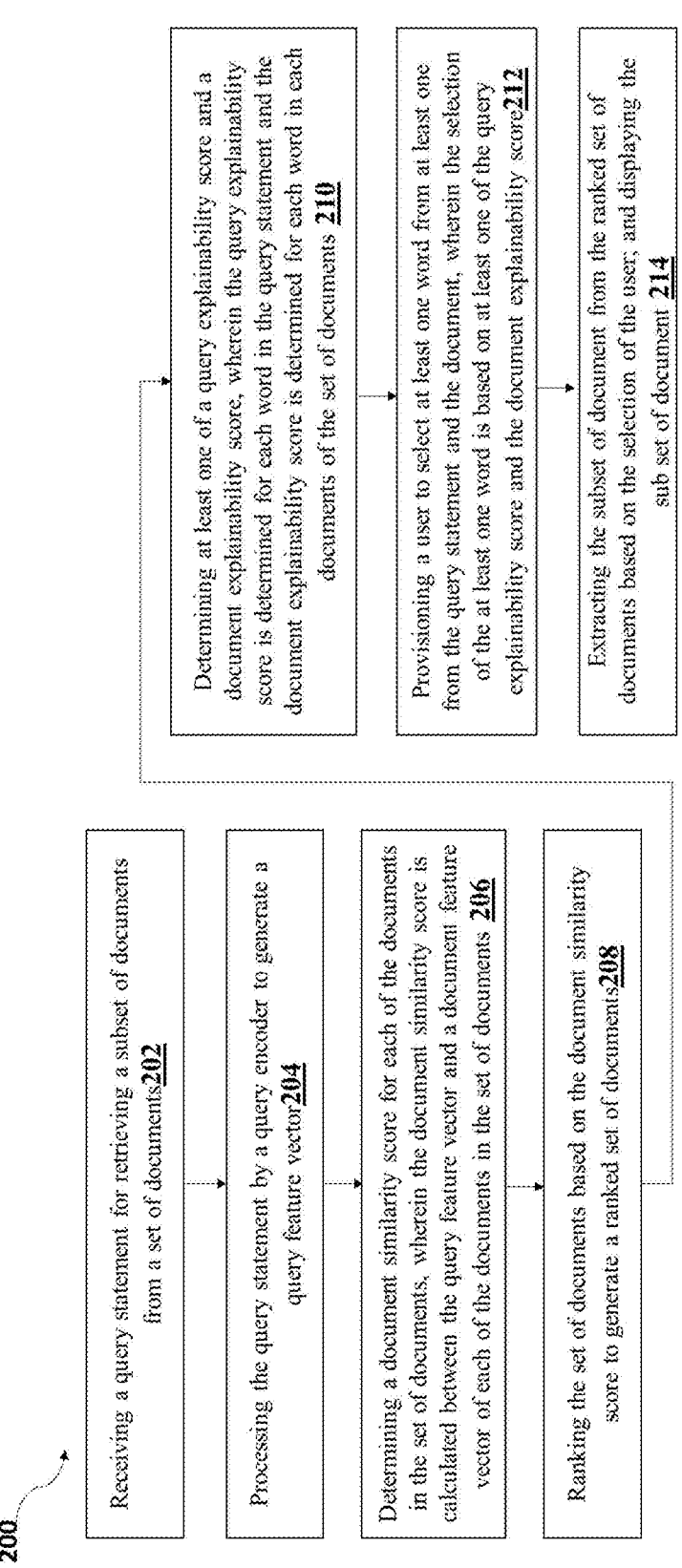

Receiving a query statement for retrieving a subset of documents from a set of documents 202

Processing the query statement by a query encoder to generate a query feature vector 204

Determining a document similarity score for each of the documents in the set of documents, wherein the document similarity score is calculated between the query feature vector and a document feature vector of each of the documents in the set of documents 206

Ranking the set of documents based on the document similarity score to generate a ranked set of documents 208

Determining at least one of a query explainability score and a document explainability score, wherein the query explainability score is determined for each word in the query statement and the document explainability score is determined for each word in each documents of the set of documents 210

Provisioning a user to select at least one word from at least one from the query statement and the document, wherein the selection of the at least one word is based on at least one of the query explainability score and the document explainability score 212

Extracting the subset of document from the ranked set of documents based on the selection of the user; and displaying the sub set of document 214

PRODUCTIVITY IMPROVEMENTS IN DOCUMENT COMPREHENSION

CROSS-REFERENCE TO RELATED APPLICATIONS

This application claims priority under 35 U.S.C. 119(a) from Indian provisional patent application No. 202241053604 filed on Sep. 19, 2022, which is pending and which is hereby incorporated by reference in its entirety for all purposes.

FIELD OF THE INVENTION

The present invention relates to the field of knowledge retrieval generally and in particular to a system and method for productivity improvements in document comprehension.

BACKGROUND OF THE INVENTION

Data is the cornerstone of contemporary knowledge-based economy. A vast pool of data is present in almost all subject areas, but navigating through this abundance to extract relevant information presents a significant challenge. In commonly used knowledge retrieval systems, there is a predilection for natural language queries, a popular preference amongst the users as well. Many users also lean towards retrieving data using such natural language queries. Within such systems, users pose inquiries, and the system endeavors to locate pertinent data that addresses these queries. However, a gap frequently exists in these systems, encompassing the user's existing knowledge, the formulated question, and the available content data. This disconnect may arise from the user's unfamiliarity with specific terms or the omission of important concepts in their query, which are vital for locating the most pertinent responses.

Many of the existing systems might rely on question-answer pairings, where potential questions are matched with corresponding answers. When a user submits a question, the system furnishes the associated answer. But these sort of systems are not suitable for comprehending huge set of documents as users will not be confident enough when they are unaware how the document is getting selected. These shortcomings render current systems inefficient, rigid, and incapable of accommodating user requirements.

Hence, there is a need for an interactive system that helps the user in document comprehension by enabling continuous refinement of document retrieval.

SUMMARY OF THE INVENTION

According to an embodiment, the present invention discloses a computing system. The system includes one or more processors; one or more storage media; one or more computer programs stored in the one or more storage media and configured for execution by the one or more processors. The one or more computer programs includes instructions configured for: receiving a query statement for retrieving a subset of documents from a set of documents; processing the query statement by a query encoder to generate a query feature vector; determining a document similarity score for each of the documents in the set of documents. The document similarity score is calculated between the query feature vector and a document feature vector of each of the documents in the set of documents. The one or more computer programs further includes instructions configured for ranking the set of documents based on the document similarity score to generate a ranked set of documents; determining at least one of a query explainability score and a document explainability score, wherein the query explainability score is determined for each words in the query statement and the document explainability score is determined for each words in each documents of the set of documents. The one or more computer programs further includes instructions configured for provisioning a user to select at least one word from at least one from the query statement and the document, wherein the selection of the at least one word is based on at least one of the query explainability score and the document explainability score; extracting the subset of documents from the ranked set of documents based on the selection of the user; and displaying the sub set of document.

According to an embodiment, the present invention discloses a computer-implemented method. The method includes the steps of receiving a query statement for retrieving a subset of documents from a set of documents; processing the query statement by a query encoder to generate a query feature vector; determining a document similarity score for each of the documents in the set of documents, wherein the document similarity score is calculated between the query feature vector and a document feature vector of each of the documents in the set of documents; ranking the set of documents based on the document similarity score to generate a ranked set of documents; determining at least one of a query explainability score and a document explainability score. The query explainability score is determined for each word in the query statement and the document explainability score is determined for each word in each documents of the set of documents. The method further included the step of; provisioning a user to select at least one word from at least one from the query statement and the document, wherein the selection of the at least one word is based on at least one of the query explainability score and the document explainability score; extracting the subset of document from the ranked set of documents based on the selection of the user; and displaying the sub set of document.

According to another embodiment, the present invention discloses one or more non-transitory computer-readable media. The one or more non-transitory computer—readable media includes one or more computer programs. The one or more computer programs includes instructions configured for: receiving a query statement for retrieving a subset of documents from a set of documents; processing the query statement by a query encoder to generate a query feature vector; determining a document similarity score for each of the documents in the set of documents, wherein the document similarity score is calculated between the query feature vector and a document feature vector of each of the documents in the set of documents; ranking the set of documents based on the document similarity score to generate a ranked set of documents; determining at least one of a query explainability score and a document explainability score, wherein the query explainability score is determined for each words in the query statement and the document explainability score is determined for each words in each documents of the set of documents; provisioning a user to select at least one word from at least one from the query statement and the document, wherein the selection of the at least one word is based on at least one of the query explainability score and the document explainability score; extracting the subset of document from the ranked set of documents based on the selection of the user; and displaying the sub set of document.

BRIEF DESCRIPTION OF THE DRAWINGS

The foregoing and other features of embodiments of the present invention will become more apparent from the following detailed description of embodiments when read in conjunction with the accompanying drawings. In the drawings, like reference numerals refer to like elements.

FIG. 2 illustrates the block diagram of a method productivity improvement in document comprehension, in accordance with an embodiment of the invention.

DETAILED DESCRIPTION

In the following detailed description, reference is made to the accompanying drawings that form a part hereof, and in which shown by way of illustration specific embodiments that may be practiced. These embodiments are described in sufficient detail to enable a person skilled in the art to practice the invention, and it is to be understood that other embodiments may be utilized and that logical, mechanical, and other changes may be made within the scope of the embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. The singular forms "a," "an," and "the" include plural references unless the context clearly dictates otherwise. The following detailed description is, therefore, not be taken as limiting the scope of the invention, but instead the invention is to be defined by the appended claims.

To address the deficiencies and limitations of existing search systems or document comprehension systems, various aspects of the present disclosure are directed to systems and techniques for improving productivity during document comprehension. The system generates the explainability score for the search statement or the query statement according to which the documents needs to be comprehended and further the system generates the document explainability score which provides the reason for the presence of the particular document in the document retrieval.

Figure 1:
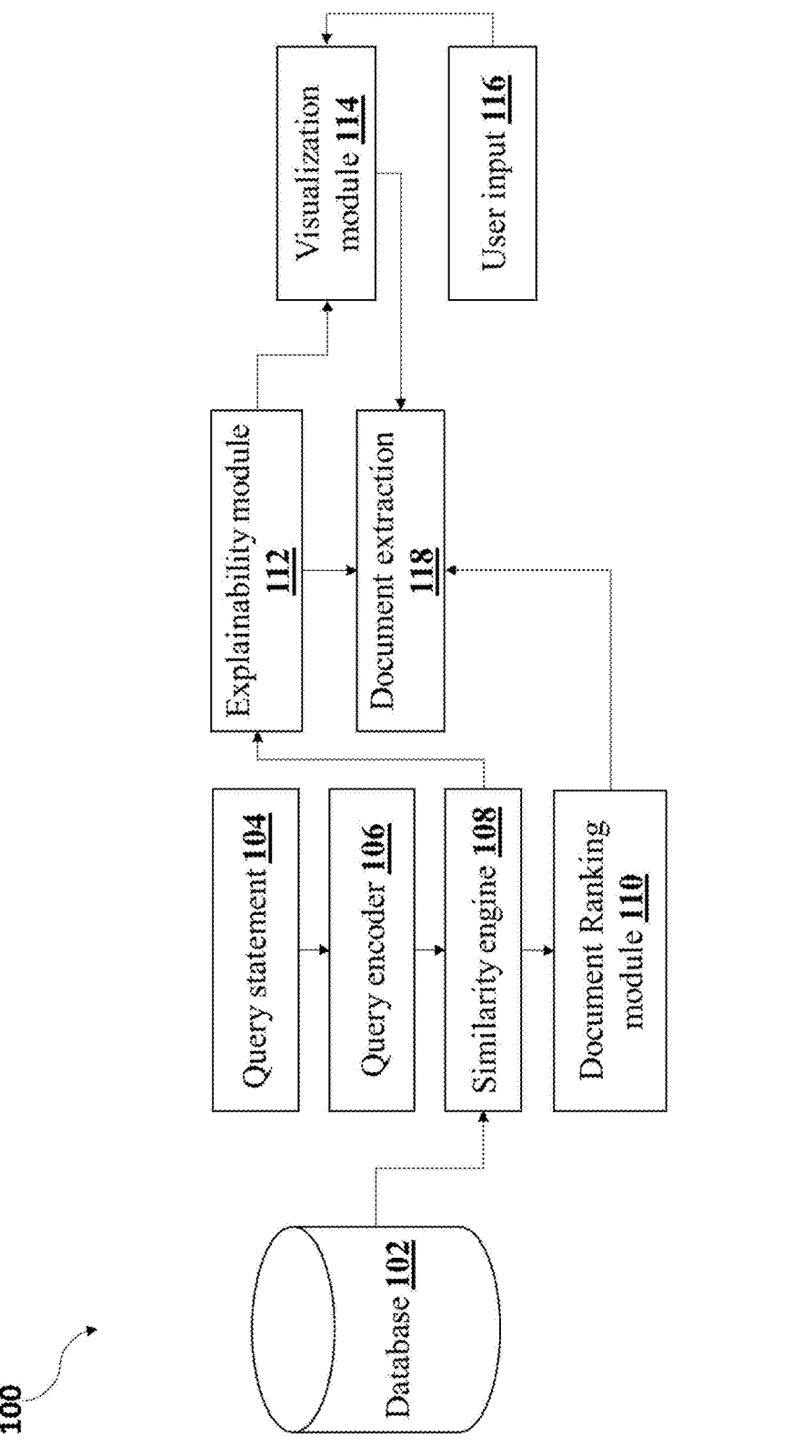
FIG. 1 illustrates the block diagram of a system 100 configured for productivity improvement in document comprehension, in accordance with an embodiment of the invention.

FIG. 1 illustrates the block diagram of a system 100 configured for productivity improvement in document comprehension, in accordance with an embodiment of the invention. The system 100 includes a database 102 where a set of documents are stored. Each of the document in the set of documents is stored along with their document feature vector. The system 100 includes a query encoder 106 wherein the query encoder receives a query statement 104 and generates a query feature vector. The system 100 also includes a similarity engine 108, wherein the similarity engine 108 determines a document similarity score for each of the documents in the set of documents. The similarity score generated by the similarity engine 108 is utilized by a document ranking module 110 to rank the documents in the set of documents to generate a ranked set of documents. The system 100 includes an explainability module 112 for determining at least one of a query explainability score and a document explainability score, wherein the query explainability score is determined for each word in the query statement and the document explainability score is determined for each word in each documents of the set of documents. The system 100 also includes a visualization module 114, wherein the visualization module 114 displays at least one word from at least one of the query statement and the document, wherein the display of the at least one word is based on at least one of the query explainability score and the document explainability score. The system 100 provisions a user to provide a user input 116 by selecting at least one word from at least one from the query statement and the document. The system 100 includes a document extraction 118 to extract a subset of documents from the ranked set of documents based on the selection of the user and displaying the subset of documents.

According to an embodiment of the present invention, document feature vectors are generated using a trained neural network, which encodes human understanding and relation amongst different text items, keywords, sentences, paragraphs and documents. According to an embodiment of the present invention, document feature vectors are mathematical representations that are generated by training neural networks with large number knowledge corpus such as Wikipedia technical literature, patents database etc. In an embodiment of the present invention, the methods used for generating feature vectors are at least one of deep learning models such as Recurrent Neural Network (RNN), Long Short-Term Memory (LSTM), Convolutional Neural Network (CNN), Bidirectional Encoder Representations from Transformers (BERT), Bidirectional Encoder Representations from Transformers for Biomedical Text Mining (BIOBERT), Financial BERT (FINBERT), Scientific BERT (SCIBERT), Generative Pre-trained Transformer 3 (GPT3), Distillable BERT (DISTILBERT), Sentence BERT (SBERT), Universal Sentence Encoder etc. In yet another embodiment of the present invention, the document feature vectors are generated using different types of large language models such as Transformers, Graph Neural Network, Prompt based Transformer learning, Active Learning on language transformers.

According to an embodiment of the present invention, the feature vectors such as document feature vector and query feature vector are generated through various Natural Language Processing (herein after referred as NLP) techniques or models such as for example but not limited to word embeddings (e.g., Word2Vec, GloVe), document embeddings (e.g., Doc2Vec), or other transformer-based models such as Bidirectional Encoder Representations from Transformers (BERT), Generative Pre-training Transformer (GPT). According to an embodiment of the present invention, the feature vector represents the text data in a high-dimensional space. Each dimension in these feature vectors represents a certain aspect or feature of the text, which allows NLP models to work with and understand textual data more effectively. According to an embodiment of the present invention, the feature vector representations of documents is stored in a database for efficient document retrieval. According to an embodiment of the present invention, when the query statement is provided to the system, the database can be used to find the most similar documents based on feature vector similarity metrics (e.g., cosine similarity).

According to an embodiment of the present invention, the similarity engine 108 uses either a sentence similarity or a document similarity to generate the similarity score. In yet another embodiment of the present invention, the similarity engine 108 uses both a sentence similarity and a document similarity to generate the similarity score. In an embodiment of the present invention, to generate a sentence similarity, the feature vector for different sentences are compared to compute vector distance between any two sentences to identify most similar sentences. In an embodiment of the present invention, the similarity engine 108 uses the sentence similarity method to identify sentences or documents which has contexts similar to the query statement inputted by user. In yet another embodiment of the present invention, the similarity score is generated based on the vector distance between the query feature vectors and the document vector features. In an embodiment of the present invention, the vector distance is calculated using cosine similarity. The similarity score generated by the similarity engine 108 is utilized by a document ranking module 110 to rank the documents in the set of documents to generate a ranked set of documents.

According to an embodiment of the present invention, the explainability module 112 further includes an explainability ranking module to rank at least one of the words in the query statement based on the query explainability score and at least one word in documents in the set of documents based on the document explainability score.

According to an embodiment of the present invention, the visualization module 114 shortlists the words for display based on the explainability rank assigned to them by the explainability ranking module. In an embodiment of the present invention, a word cloud or a word frequency plot of shortlisted words are provisioned to enable more interactive visualization of entire search result and aids user in more efficient intent based result list exploration, navigation, and filtering. According to an embodiment of the present invention, the word cloud or the word frequency plot is constructed only from words from the query statement or only words belonging to documents or a combination of words from both the query statement and the documents. In an embodiment of the present invention, the user may interact simultaneously with multiple word clouds or word frequency plot generated based on query explainability score and the document explainability score. In an embodiment of the present invention, an interactive visualization may be word clusters formed based on query explainability scores and document explainability scores.

According to an embodiment of the present invention, the visualization module 114 further includes a visualization map generator to generate a visualization map of words from at least one of the query statement and words in the documents in the set of documents based on at least one of the query explainability score and the document explainability score. According to an embodiment of the present invention, the visualization map includes a correlation of the at least one word in the query statement based on the query explainability score and the at least one word in at least one document of the set of documents based on the document explainability score. According to an embodiment of the present invention, the correlation between words in query statement and words in the document is established based on cosine similarity score between the feature vectors of the query statements and the document feature vector. In an embodiment of the present invention, the query feature vector and the document feature vectors are BERT embeddings of query words and document words. In an embodiment of the present invention, the correlation of the at least one word in the query statement and the at least one word in at least one document of the set of documents is established based on the product of query explainability score, document explainability score and cosine similarity score between BERT embedding of query word and the document word.

According to an embodiment of the present invention, salient pairs is generated using correlation computed based on the product of query explainability score, document explainability score and cosine similarity score between input BERT embedding of query word and the document word. The pair of words with higher correlation score indicates stronger semantic coherence and also indicates their stronger influence document similarity score and rank.

According to an embodiment of the present invention, explainability module computes a explainability score for every word present in the query statement and/or the documents in the set of documents. In an embodiment of the present invention, the explainability score of any word explains the contribution of that word to the similarity score between the query statement and the document computed by the similarity engine. In another embodiment of the present invention, a cosine similarity score between two feature vectors (i.e query feature vector and document feature vector) and explainability score of any given word present in query statement or at least one document paragraphs explain the contribution of that word to the cosine similarity score computed by similarity engine (i.e. cosine similarity score between query feature vector and document feature vector). Here the explainability score is query explainability score in case of words in the query statement and document explainability score in case of words present in the documents.

According to an embodiment of the present invention, the explainability module employs different methods and approaches to determine the explainability score. According to an embodiment of the present invention, one of the approach for determining the explainability score is feature importance, where the at least one feature or at least one variable that had the most influence on a model's decision is identified. According to another embodiment of the present invention, one of the approach for determining the explainability score is local explanations where explanations for individual predictions are provided. In an embodiment of the present invention, explainability score is determined using techniques such as Local Interpretable Model-agnostic Explanations (LIME) generate local explanations for specific instances.

In yet another embodiment of the present invention, one of the approach for determining the explainability score is global explanations. Global explanations provide insights into the overall behavior of the model. Shapley additive explanations (SHAP) is one method for providing global explanations. In an embodiment of the present invention, one of the approach for determining the explainability score is rule-based models, wherein rule-based models create interpretable models such as decision trees or rule-based systems that approximate the behavior of more complex models. In yet another embodiment of the present invention, one of the approach for determining the explainability score is attention mechanism, wherein in case of neural networks, attention mechanism is used to visualize which parts of the input data the model focused on when making a prediction.

According to an embodiment of the present invention, one of the approach for determining the explainability score is saliency mechanism. The saliency refers to the measure of the importance or relevance of different features or components of input data in influencing a model's prediction. Saliency maps or saliency scores are used to highlight which parts of the input data are most responsible for a particular output from a machine learning model. Saliency is particularly useful for understanding why a model made a specific decision or prediction. Saliency maps are visual representations that indicate the regions or features in an input (e.g., an image, text, or audio signal) that have the highest influence on a model's prediction. In an image, a saliency map might highlight the most important pixels or regions. In natural language processing, it might identify the key words or phrases.

According to an embodiment of the present invention, saliency mechanism for determining the explainability score is a gradient-based saliency mechanism. In gradient-based saliency mechanism gradient of the deep learning model's output with respect to the input text feature vectors is derived as saliency scores or explainability scores. According to an embodiment of the present invention, larger gradient values indicate higher feature saliency. Large gradient values indicate more responsibleness and influence of input text feature on output prediction from deep neural network model. According to an embodiment of the present invention, backpropagation through a model's layers, starting from a final layer and moving backward, allows you to compute the gradient of the loss with respect to the input. The gradient values reflect how changes in the input text features would affect a model's prediction. In natural language processing, saliency may reveal which words or phrases in a text document had the most influence on a similarity score or classification result. According to an embodiment of the present invention, explainability score or saliency score is computed based on absolute gradient values. In accordance with an embodiment of the present invention the explainability module determines gradient values for all words of the query statement and the words in the documents. According to an embodiment of the present invention, query word or document word with larger gradient values have more responsibilities and influence on similarity score. According to an embodiment of the present invention, gradient values of words in query text are derived as query explainability score. In an embodiment of the present invention, gradient values of words in documents are derived as document explainability score.

In an embodiment of the present invention, saliency score is a useful tool for explaining document similarity scores to understand which parts of two documents contribute the most to their similarity. According to an embodiment of the present invention, the saliency score is useful to understand which parts of query and document contribute the most to their similarity.

According to an embodiment of the present invention, query explainability score is determined for each word in the query statement based on saliency score or gradient for each word in the query by the explainability module. In an embodiment of the present invention, document explainability score is determined for each word in each document of the set of documents based on saliency score or gradient for each word in each document of the set of documents by the explainability module.

According to an embodiment of the present invention, the query explainability scores and document explainability scores indicates which words in the query statement and the document has the highest influence on the similarity score. The system analyses the explainability score to understand which parts of the documents contributed the most to the similarity score and identifies specific words or phrases that led to the documents being considered similar.

According to another embodiment of the present invention, the system 100 includes a clustering module for grouping the subset of documents based on the selection of the user. In an embodiment of the present invention, the user may select a word based on which the clustering is performed by the clustering module. In an embodiment of the present invention, the documents are processed with various clustering techniques such as K-Means, K-Nearest Neighbour search or any other Nearest Neighbour search methods to enable user to explore and understand various topics amongst huge list of documents.

According to an embodiment of the present invention, the system further stores the selections made by the user. In an embodiment of the present invention, the user may select at least one word from the query statement. In another embodiment of the present invention, the user may select at least one word from the set of documents. In yet another embodiment of the present invention, the user may select one or more words from the query statement and one or more statements from the documents.

According to an embodiment of the present invention, the user selection of the at least one word may include a tag. In an embodiment of the present invention, the tag associated with the at least one word is a relevancy tag. The relevancy tag may indicate that the at least one word is relevant or not relevant to the context of the query statement.

According to an embodiment of the present invention, the system further includes a context learning engine configured to learn the context of the query statement from the words and its associated tags in the stored selections. The context learning engine helps the system to understand the user interests with respect to the query statement so as to refine the results of the document extraction.

According to an embodiment of the present invention, the system further includes a query expansion engine to expand the query statement. In an embodiment of the present invention, the expansion is based on the selection of the word from the words in the documents. This enables the user to define the query statement in an efficient manner. In yet another embodiment of the present invention, the selected words may be used to perform some complementary keyword searches using the selected words along with the words in the query statement.

According to another embodiment of the present invention, the system further includes a question answer engine to generate an answer for a question input by the user. In an embodiment of the present invention, the answer for a question is generated from the sub set of documents.

According to an embodiment of the present invention, the query statement is received to extract a subset of documents from a set of documents. In an embodiment of the present invention, the subset of document may be at least one document.

According to an embodiment of the present invention, the explainability module further includes creation of an explainability table for each of the document in the subset of documents. The explainability table illustrates the query statement terms and the corresponding word from the words in the document. This explains the reason for including a particular document in the subset of documents.

According to another embodiment of the present invention, the system includes a knowledge graph engine to create an ontology or a taxonomy related to the query statement. In an embodiment of the present invention, the knowledge graph engine creates the ontology or taxonomy specific to a domain. In another embodiment of the present invention, the ontology or taxonomy created may be specific to the user based on the selection of words based on query explainability score or knowledge explainability score.

According to an embodiment of the present invention, the words corresponding to the query explainability score and the document explainability score based on the selection of the user are stored to provide a stored data, wherein the stored data is used for learning the user interest in context of the query statement. The stored data is used further for fine tuning or training of language model such as BERT model. The fine tuning of language model may be specific to different domains and technologies. In an example embodiment of the invention, fine tuning may be specific to domains such as aerospace or sub-domains or technologies such as additive manufacturing, renewable energy etc. In an embodiment of the present invention, the patent datasets for training may be separately grouped based on various technology domain like aerospace, chemistry, medical etc.

In yet another embodiment of the present invention, the system includes an annotation engine for annotating the documents based on the explainability table details. The query terms for which the words in the documents are mapped may be used for annotating the document. This may help the user to retrieve such documents in a faster manner in subsequent searches.

According to an embodiment of the present invention, the set of documents which may be comprehended may include patent documents, scientific literatures, company financial statements, litigation case histories, contract agreements, policy guidelines and handbooks, compliance and regulatory standards, enterprise archives or any other such huge documents.

FIG. 2 illustrates the block diagram of method productivity improvements in document comprehension, in accordance with an embodiment of the invention. The method 200 includes the step 202 of receiving a query statement for retrieving a subset of documents from a set of documents and the step 204 of processing the query statement by a query encoder to generate a query feature vector. The method 200 further includes the step 206 of determining a document similarity score for each of the documents in the set of documents, wherein the document similarity score is calculated between the query feature vector and a document feature vector of each of the documents in the set of documents and the step 208 of ranking the set of documents based on the document similarity score to generate a ranked set of documents. The method 200 also includes the step 210 of determining at least one of a query explainability score and a document explainability score, wherein the query explainability score is determined for each word in the query statement and the document explainability score is determined for each word in each documents of the set of documents. The method 200 further includes the step 212 of provisioning a user to select at least one word from at least one from the query statement and the document, wherein the selection of the at least one word is based on at least one of the query explainability score and the document explainability score and step 214 of extracting the subset of document from the ranked set of documents based on the selection of the user; and displaying the sub set of document.

According to an embodiment of the present invention, the method 200 also includes the step of ranking at least one of the words in the query statement based on the query explainability score and the words in each documents in the set of documents based on the document explainability score. In an embodiment of the present invention, the method 200 also includes the step of generating a visualization map of words based on at least one of the query explainability score and the document explainability score, wherein the visualization map comprises a correlation of the at least one word in the query statement based on the query explainability score and the at least one word in at least one document of the set of documents based on the document explainability score. In yet another embodiment of the present invention, the method 200 includes the step of generating at least one pair of word contributing to the document similarity score, wherein the at least one pair of word has the at least one word in the query statement and the at least one word in the document and guiding the user to refine the query statement by providing a visualization of the at least one pair of word. According to another embodiment of the present invention, the method 200 includes the step of grouping the subset of documents based on the selection of the user. In yet another embodiment of the present invention, the method 200 includes the step of storing the words corresponding to the query explainability score and the document explainability score based on the selection of the user to provide a stored data, wherein the stored data is used for learning the user interest in context of the query statement. According to an embodiment of the present invention, the method 200 further includes a step of generating an answer for a question input by the user from the sub set of documents.

According to an embodiment of the present invention, a non-transitory computer-readable media includes one or more computer programs including instructions configured for receiving a query statement for retrieving a subset of documents from a set of documents; processing the query statement by a query encoder to generate a query feature vector; determining a document similarity score for each of the document in the set of documents, wherein the document similarity score is calculated between the query feature vector and a document feature vector of each of the documents in the set of documents; ranking the set of documents based on the document similarity score to generate a ranked set of documents; determining at least one of a query explainability score and a document explainability score (to explain the rank of the document), wherein the query explainability score is determined for each words in the query statement and the document explainability score is determined for each words in each documents of the set of documents; provisioning a user to select at least one word from at least one from the query statement and the document, wherein the selection of the at least one word is based on at least one of the query explainability score and the document explainability score; extracting the subset of document from the ranked set of documents based on the selection of the user; and displaying the sub set of document.

According to another embodiment of the present invention, the non-transitory computer-readable media further includes at least one instruction configured for ranking at least one of the words in the query statement based on the query explainability score and the words in each documents in the set of documents based on the document explainability score.

In another embodiment of the present invention, the non-transitory computer-readable media further includes at least one instruction configured for generating a visualization map of words based on at least one of the query explainability score and the document explainability score, wherein the visualization map comprises a correlation of the at least one word in the query statement based on the query explainability score and the at least one word in at least one document of the set of documents based on the document explainability score.

In another embodiment of the present invention, the non-transitory computer-readable media further includes at least one instruction configured for generating at least one pair of word contributing to the document similarity score, wherein the at least one pair of word has the word from the query statement and the word from the document, wherein the at least one pair of word is generated based on the query explainability score and the document explainability score.

In another embodiment of the present invention, the non-transitory computer-readable media further includes at least one instruction configured for guiding the user to refine the query statement by providing a visualization of the at least one pair of word In another embodiment of the present invention, the non-transitory computer-readable media further includes at least one instruction configured for grouping the subset of documents based on the selection of the user.

In another embodiment of the present invention, the non-transitory computer-readable media further includes at least one instruction configured for storing the words corresponding to the query explainability score and the document explainability score based on the selection of the user to provide a stored data, wherein the stored data is used for learning the user interest in context of the query statement.

In another embodiment of the present invention, the non-transitory computer-readable media further includes at least one instruction configured for generating an answer for a question input by the user from the sub set of documents.

Figure 3:
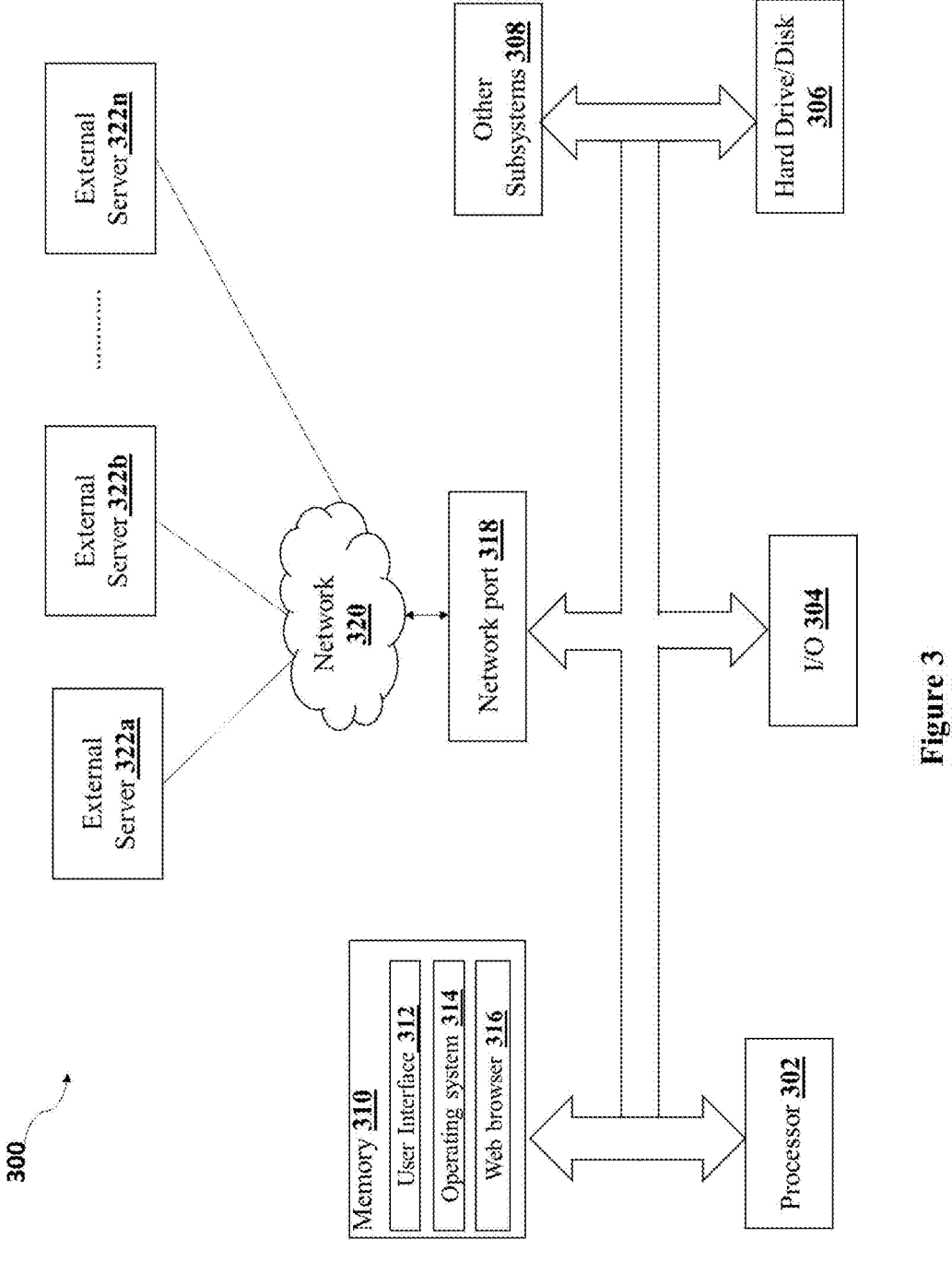
FIG. 3 illustrates an exemplary network environment for implementing the system and method for productivity improvements in document comprehension, in accordance with an embodiment of the present invention.

FIG. 3 illustrates an exemplary network environment 300 for implementing the system and method for productivity improvements in document comprehension, in accordance with an embodiment of the present invention. The network environment 300 includes a processor 302, an input/output device 304, a hard drive or hard disk storage 306 and various other subsystems 308, wherein the various subsystems facilitates the functioning of the entire system. The processor 302 may be disposed in communication with one or more input/output (I/O) devices via I/O interface. The I/O interface may employ communication protocols/methods such as, without limitation, audio, analog, digital, monaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc. The input/out device 304 may include but is not limited to display, a touchscreen, a mouse and associated controllers for the input/output devices. The network environment 300 also includes a memory 310 of the system, which further includes user interface 312, an operating system 314 and a web browser 316. The network environment 300 further includes the network port 318, which facilitates the connection of the above-mentioned components into the network 320, wherein the network 320 is a communication network. The network port 318 and the network 320, helps in connecting the processor 302 to the various external servers such as 322a, 322b, 322n that contains various data that the system need to perform document comprehension.

In another embodiment, the processor 302 may be disposed in communication with a network 320 via a network port 318. The network port 318 may communicate with the network 320 The network port 318 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The network 320 may include, without limitation, a direct interconnection, local area network (LAN), wide area network (WAN), wireless network (e.g., using Wireless Application Protocol), the Internet, etc.

According to an embodiment of the present invention, the set of documents are patent documents. The use of present system to comprehend the patent documents helps the user to categorize, tag and map various patent documents for their last mile conclusion of competitive business insights and legal insights.

According to an embodiment of the present invention, the query statement may be technical explanation of an invention, wherein the user wants to extract documents that discloses the invention.

In an embodiment of the present invention, when the set of documents is patent documents, the ranking of documents may be performed based on the claims in the patent document. In an embodiment of the present invention, for document similarity and ranking of documents each of the claim in the patent is split into multiple claim limitations. In an embodiment of the present invention, the multiple claim limitations are various steps of a method. In another embodiment of the present invention, the ranking is done for the various claim limitations present in the claim. According to an embodiment of the present invention, the system maps a product feature and a claim in a patent document, wherein the product feature is a query statement corresponding to a freedom to operate search on patent documents based on explainability score such as the query explainability scores and document explainability scores.

According to an embodiment of the present invention, the system provides a provision for performing keyword search using Boolean operators, proximity operators, wild card operators and any other advanced keyword search functionalities. In an embodiment of the present invention, a result of the keyword search and the document feature vector based document similarity scores are used for ranking the documents. In another embodiment of the present invention, either the result of the keyword search or the document feature vector based document similarity scores is used for ranking the documents. In an embodiment of the present invention, the result of the keyword search may include best matching (BM25) score or Term Frequency-Inverse Document (TF-ID) score.

According to an embodiment of the present invention, combination of keyword search, feature vector based document similarity score and explainability score are used to conduct various task such as document search, document classification, question answering, auto-annotation, context extraction, text-to-image search and document summarization.

According to an embodiment of the present invention, combination of keyword search, feature vector based document similarity score and explainability score enable the user to conduct various types of patent due diligence like novelty assessments, patent landscape, product risk assessments, innovation-ideation process, technology licensing, technology assertion and technology transfer opportunities. According to another embodiment of the present invention, the system is configured to generate a last mile insights and conclusions for patent due diligence workflow such as discovering closest prior arts, generating novelty strength score, suggesting multilevel categorization of patents, generating a patent eligibility subject matter score, differentiating patent documents based on their technologies mapping product features to claim elements of the patent document, generating a freedom to operate (FTO) risk score of a given product when compared to set of shortlisted patents, generating a validity score for a patent when compared to a set of shortlisted patents, extracting at least one context from the patent, discovering patents with similar contexts, comparing an organizations patent portfolio for Strengths, Weaknesses, Opportunities, and Threats (SWOT) analysis, paraphrasing and comparing figures of the patents, generating year-wise technology evolution in patents, a question answering interface for strategic questions, guided prompts for workflows specific to different advanced level analyst work products valuation, tech-transfer, standard essential patents (SEP) eligibility etc.

According to an embodiment of the present invention, extracting at least one context wherein the context is related to a problem, solution, hardware, software, advantage, industry, product, application of a patent document.

According to an embodiment of the present invention, the system has real time on the fly active learning, wherein the selections of words by the user are used as real time feedback. In an embodiment of the present invention, the user may select a word from the visualization of words from the document and mark it as either relevant or not relevant. In another embodiment of the present invention, the user may select words iteratively and optimizes the accuracy of context extraction, document similarity rank and question answering.

According to an embodiment of the present invention, the user is provided with provisions to provide priority for a section of a document while determining the similarity score. In an embodiment of the present invention, the section of the document in case of a patent document may be claims, description, classification of patents, problem statements, advantages. In another embodiment of the present invention, the section may depend on the type of the document and various sections available in the document. According to an embodiment of the present invention, the system may identify most appropriate FIG. for a given criterion with help of key word search and/or NLP feature vectors, wherein the given criterion is the query statement.

According to an embodiment of the present invention, the system may provide provision for the user to perform document retrieval for a number of different query statement, wherein the different query statements are connected to different features of a product. In an embodiment of the present invention, the system extracts different subset of documents for different features of the product. In another embodiment of the present invention, the different subset of the documents is visualized as a Venn diagram, wherein the Venn diagram gives a clear visualization of documents that are common for various features of the product According to an embodiment of the present invention, the user is provisioned to adjust a weight of a feature and document sections. The system displays the feature created automatically based on user input through NLP techniques like sentence separations, Named Entity Recognition (NER) extraction, topic extractions etc. In an embodiment of the present invention, the user has the provision to, edit the automatically created features.

According to an embodiment of the present invention, the system provides a facility to perform document classification prediction. In an embodiment of the present invention, the query statement is related to the invention and the system predicts classification for the set of patent documents based on the relevancy of the document to the invention. The predicted classification may be later This can be used to increase the ranking score of the patents. According to an embodiment of the present invention, the user may provide extra rules which may help in predicting the classification of the patent documents. In yet another embodiment of the present invention, a visualization of the predicted classification for patent documents are provided to the user to enable them to review the predicted classification. In an embodiment of the present invention, the system may provide a list of classifications and provisions the user to review and make necessary changes to the classification. The provision for classifying the set of patent documents are performed as a basic step before identifying the potentially relevant list of patents. According to an embodiment of the present invention, the rank of as subset of patent documents are boosted by defining specific domain rules set by user during interaction. According to an embodiment of the present invention, the system provides a patent classification prediction tool. In an embodiment of the present invention, the rank of a document is boosted when the document has a patent classification predicted by the system and confirmed by the user.

According to an embodiment of the present invention, the system includes a synonym suggestion tool. In an embodiment of the present invention, rank of a patent document is boosted when the patent document has the key word suggested by the synonym suggestion tool and is confirmed by the user. In yet another embodiment of the present invention, patent documents are grouped based on various technology domain like aerospace, chemistry, medical etc.

In an embodiment of the present invention, the strength of novelty of a patent is computed based on the subset of documents and their explainability scores. According to an embodiment of the present invention, the system may detect the industry or product to which a patent document belongs to. According to another embodiment of the present invention, the system provides guided prompts, and suggestions to user during screening of documents based on domain specific rules. In another embodiment of the present invention, the guided prompts may be for implementing different search workflows, insights creation workflow and various other purposes. In yet another embodiment of the present invention, guided prompts may be question and answering systems to achieve a decided work flow.

According to an embodiment of the present invention, the system stores the various interaction of user with the system and creates a library or a collection of domain specific knowledge graphs, and domain specific fine-tuned NLP language model that may be made available in a market place for reuse of models by other users.

Example embodiment of the present invention, the system and method selects a model that is capable of computing document similarity scores. In an embodiment of the present invention, a pre-trained transformer-based model such as BERT model, a Siamese network, or any other model suitable for the task. In an embodiment of the present invention, the query statement and the document text is tokenize into smaller units (e.g., words or sub-word tokens) using the tokenizer. In an embodiment of the present invention, the tokenized text is passed through the BERT model. According to another embodiment of the present invention, the system and method may use a library such as Hugging Face Transformers in Python to easily load a pre-trained BERT model and feed the input through it. According to an embodiment of the present invention, the BERT model generates query feature vectors for the query statement and document feature vectors from the documents. According to an embodiment of the present invention, computes a similarity score between the two tokenized documents using query feature vector and document feature vector. The similarity score is calculated based on the cosine similarity, dot product, or any other metric that measures document similarity. In an embodiment of the present invention, query explainability score for all words in query statement is computed by partial derivative of cosine similarity score between the query feature vector and the document feature vector with respect to of tokenized query statement while keeping document feature vector as constant and generating query feature vector by propagating tokenized query statement through BERT model. This involves performing back-propagation through the model. For deep learning frameworks this is performed through automated differentiation. Typically, in PyTorch or TensorFlow, this can be done automatically by setting the requires_grad attribute of auto-grad libraries to "True" for the input tokens. In another embodiment of the present invention, document explainability score for all words in document is computed by partial derivative of cosine similarity score between query feature vector and the document feature vector with respect to tokenized document statement while keeping query feature vector as constant and generating document feature vector by propagating tokenized document statement through the BERT model. This involves performing backpropagation through your model. For deep learning frameworks this can be done through automated differentiation. Typically, in PyTorch or TensorFlow, this can be done automatically by setting the requires_grad attribute of autograd libraries to True for the input tokens.

Figure 4:
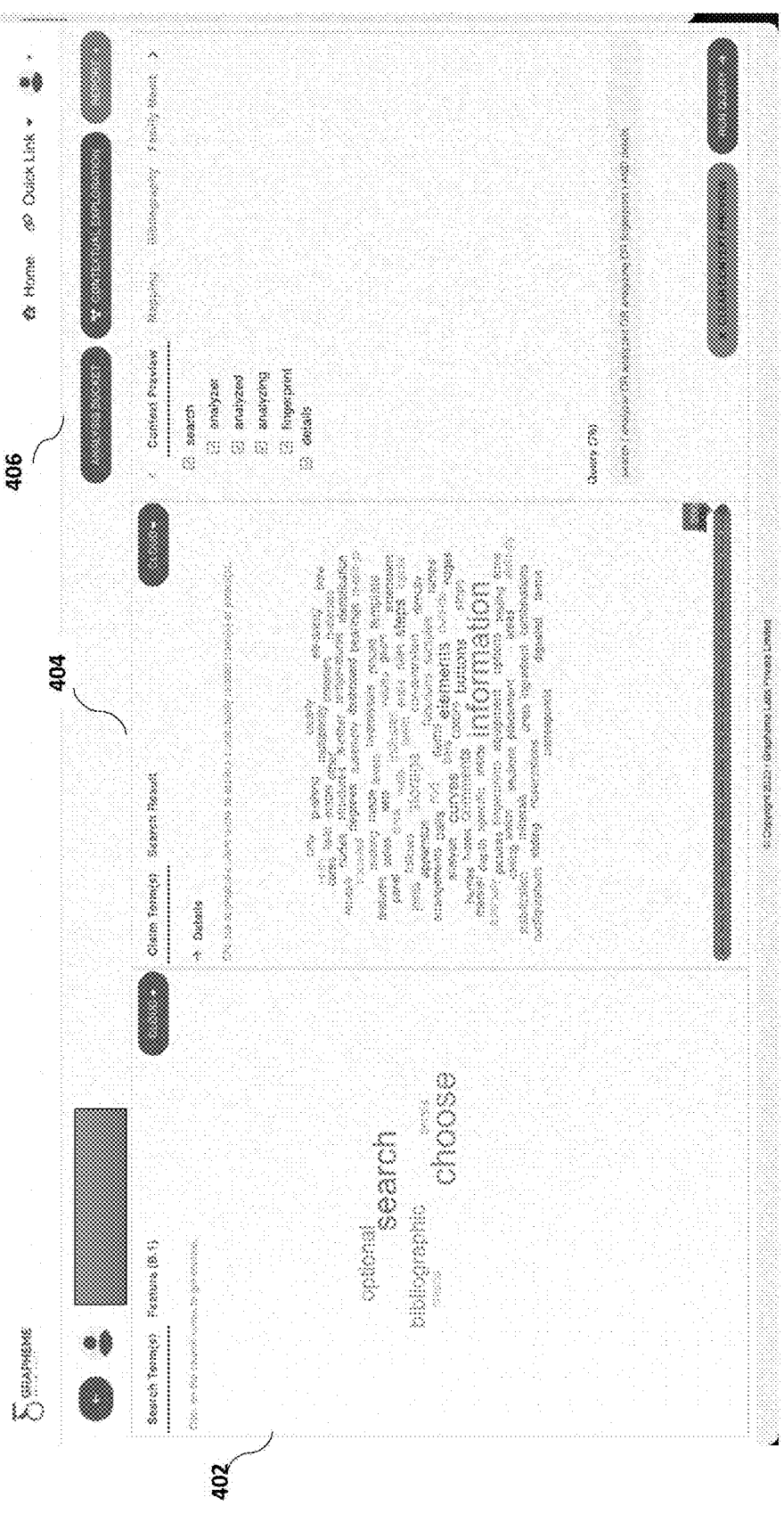
FIG. 4 illustrate an example user interface implementation, in accordance to various embodiment of the system.

FIG. 4 illustrates an example user interface implementation, where a query word cloud of the words in the query statement are displayed at 402 and a document word cloud of the words in the documents are displayed at 404. In an embodiment of the present invention, the document word cloud may be generated based on claims in patent documents. In another embodiment of the present invention, when a query term is selected then corresponding claim terms of interest may be selected by the user. The selections made by the user is displayed in the left pane 406

Figure 5:
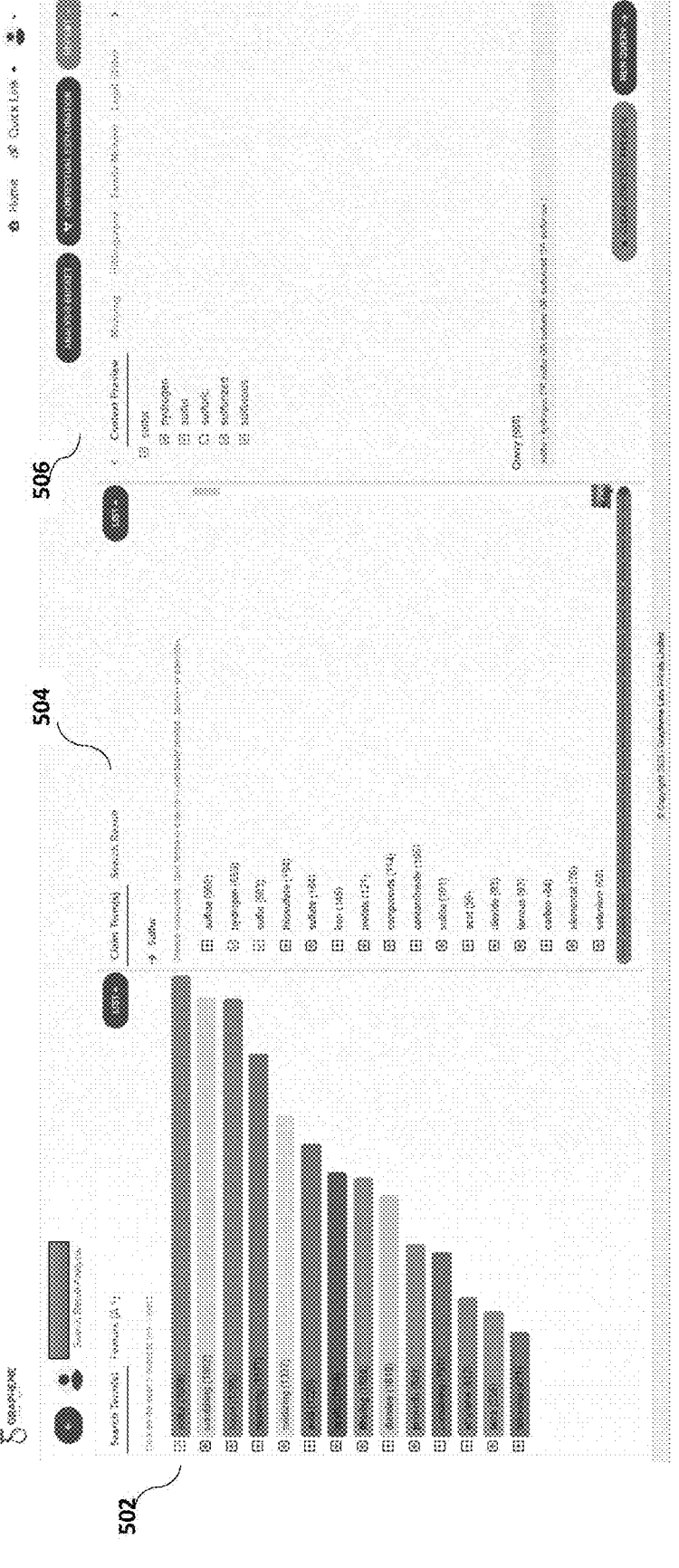
FIG. 5 illustrate an example user interface implementation, in accordance to various embodiment of the system.

FIG. 5 illustrates an example user interface implementation, the frequency of words in the query statement (search terms) is displayed at 502 and the frequency of words in documents (claim terms) in the document is displayed at 504. The selections made by the user from the words in the query statement and the selected words from the words in the document are displayed at 506.

Figure 6:
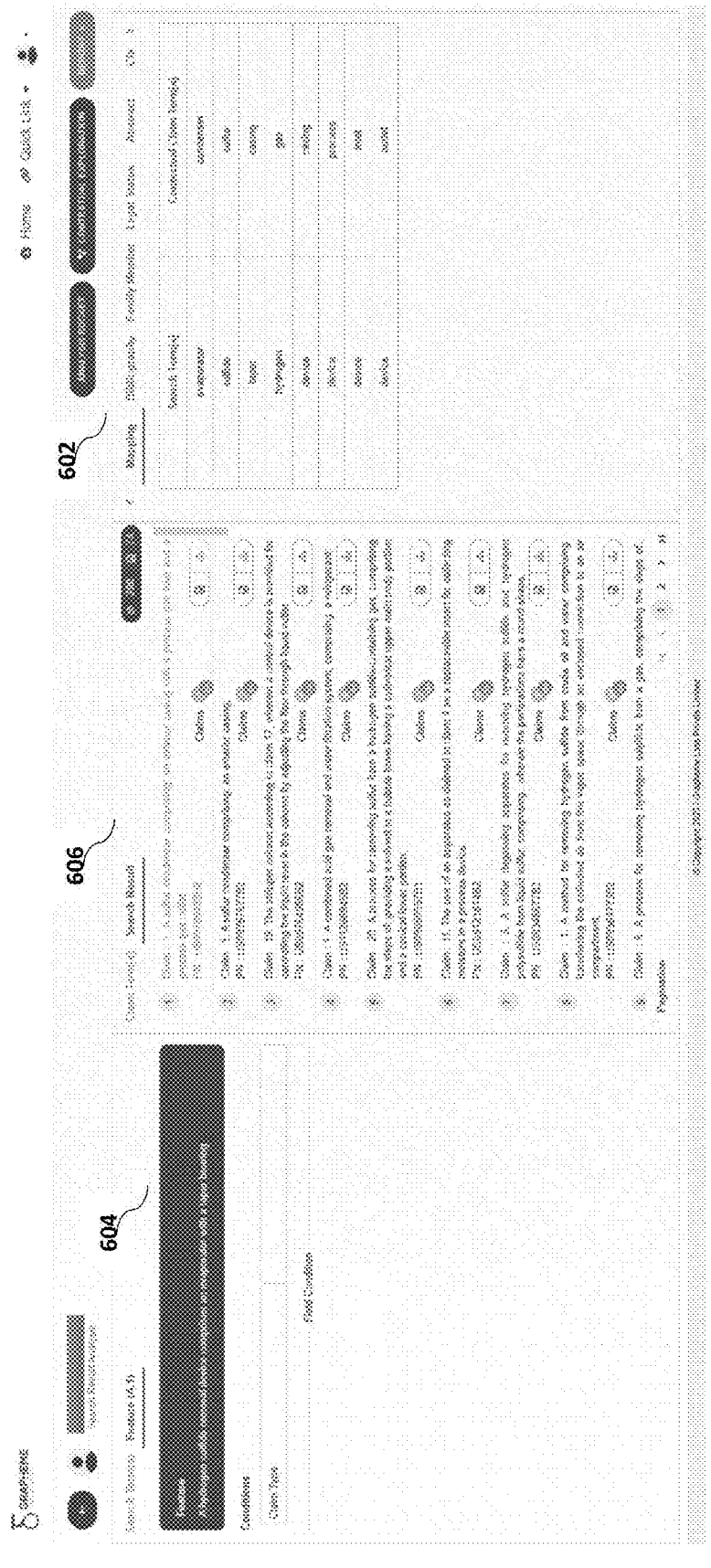
FIG. 6 illustrate an example user interface implementation, in accordance to various embodiment of the system.

FIG. 6 illustrates an example user interface implementation, the explainability table 602 gives the information of words in the query statement (search term) and words in the document (contextual claim terms) as the explainability table. These words in the document illustrates the exact context in which the document get extracted in the sub set of documents, wherein the left pane 604 illustrates the query statement as feature and the middle pane 606 illustrates the ranked sub set of documents.

Figure 7:
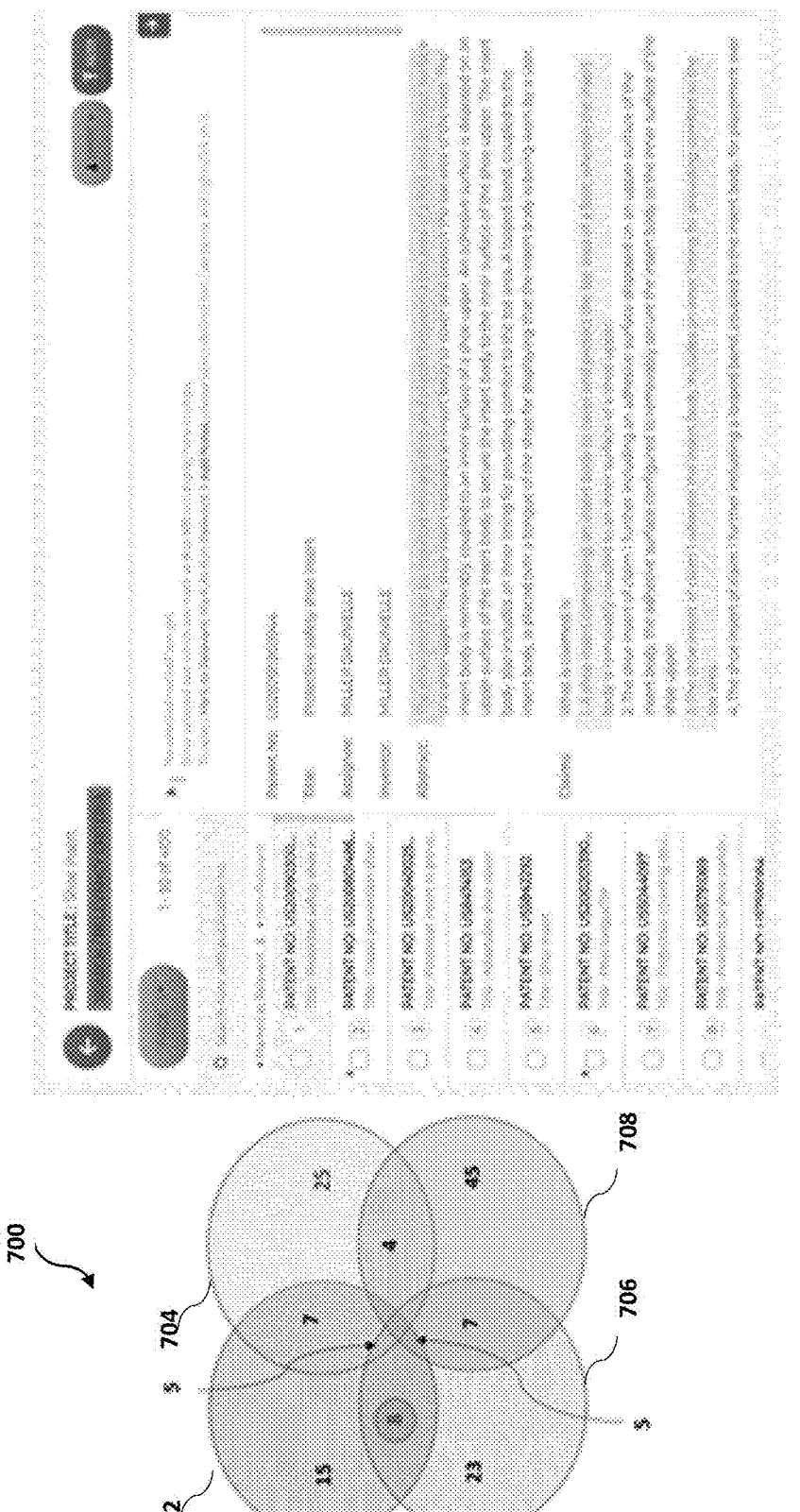
FIG. 7 illustrate an example user interface implementation, in accordance to various embodiment of the system

FIG. 7 illustrates an example user interface implementation, wherein a Venn diagram 700 illustrates the different features of a product. The different circles 702, 704, 706 and 708 represents 4 different features of a product. The Venn diagram represents a numerical value in cross-section area of product feature circles denotes a number of documents containing those multiple features.

According to an embodiment of the present invention, explainability module helps user to understand the decision-making process of similarity engine and also the reason or intuition behind similarity score computed between the query statement and the document, which would also eventually explain the rank of the document. After the document ranking module ranks the document in the set of documents to generate a ranked set of documents. In an embodiment of the present invention, explainability module goes a step further and focuses on the BERT model's ability to provide a rationale or justification for its predictions on similarity score or rank of the document Thus, it should be appreciated that the techniques and systems disclosed herein provide a technical solution to technical problems existing in the conventional industry practice of information retrieval. Furthermore, the techniques and systems disclosed herein embody a distinct process and a particular implementation that provides an improvement to existing computer systems by providing the computer systems with new capabilities and functionality for leveraging the knowledge of the query explainability score and the document explainability score in order to identify, refine, and/or re-rank search results to provide to a user more relevant content in the top ranks, which prior art computer systems do not possess.

The foregoing description of the preferred embodiment of the present invention has been presented for the purpose of illustration and description. It is not intended to be exhaustive or to limit the invention to the precise form disclosed. Furthermore, all examples recited herein are principally intended expressly to be only for pedagogical purposes to aid the reader in understanding the principles of the present subject matter and are to be construed as being without limitation to such specifically recited examples and conditions. Many modifications and variations are possible in light of the above teachings.

What is claimed is:

1. A computer-implemented method comprising:

receiving a query statement for retrieving a subset of documents from a set of documents;

processing the query statement by a query encoder to generate a query feature vector (QFV);

determining a document similarity score (DSS) for each document in the set of documents, wherein the DSS is calculated between the QFV and a document feature vector (DFV) of each document in the set of documents, and wherein the DFV is generated using a trained neural network;

ranking the set of documents based on the DSS to generate a ranked set of documents;

determining at least one of a query explainability score (QES) and a document explainability score (DES), wherein the QES is determined for each word in the query statement and the DES is determined for each word in each respective document in the set of documents, wherein the QES and DES for each respective document in the set of documents indicate which respective word in the query statement and which respective word in the set of documents has the highest influence on the DSS;

provisioning a user to select at least one word from at least one of the query statement and the respective document in the set of documents, wherein the selection of the at least one word is based on at least one of the QES and the DES;

extracting the subset of documents from the ranked set of documents based on the selection of the user; and displaying the subset of documents;

generating at least one pair of words contributing to the DSS, wherein the at least one pair of words has the at least one word in the query statement and the at least one word in the respective document in the set of documents; and providing to the user a visualization of the at least one pair of words, and receiving from the user a refinement of the query statement based on the visualization of the at least one pair of words.

2. The method of claim 1, further comprising ranking at least one of the words in the query statement based on the QES and the words in each respective document in the set of documents based on the DES.

3. The method of claim 1, further comprising generating a visualization map of words based on at least one of the QES and the DES, wherein the visualization map comprises a correlation of the at least one word in the query statement based on the QES and the at least one word in at least one document of the set of documents based on the DES.

4. The method of claim 1, further comprising grouping the subset of documents based on the selection of the user.

5. The method of claim 1, further comprising storing the words corresponding to the QES and the DES based on the selection of the user to provide stored data, wherein the stored data is used for learning a user interest in context of the query statement.

6. The method of claim 1, further comprising generating an answer for a question input by the user from the subset of documents.

7. A computing system comprising:

one or more processors;

one or more storage media;

one or more computer programs stored in the one or more storage media and configured for execution by the one or more processors, the one or more computer programs comprises instructions configured for:

receiving a query statement for retrieving a subset of documents from a set of documents;

processing the query statement by a query encoder to generate a query feature vector (QFV);

determining a document similarity score (DSS) for each of the documents in the set of documents, wherein the DSS is calculated between the QFV and a document feature vector (DFV) of each respective document in the set of documents, and wherein the DFV is generated using a trained neural network;

ranking the set of documents based on the DSS to generate a ranked set of documents;

determining at least one of a query explainability score (QES) and a document explainability score (DES), wherein the QES is determined for each word in the query statement and the DES is determined for each word in each respective document of the set of documents, wherein the QES and the DES indicate which respective word in the query statement and which respective word in each respective document have the highest influence on the DSS;

provisioning a user to select at least one word from at least one of the query statement and a respective document in the set of documents, wherein the selection of the at least one word is based on at least one of the QES and the DES;

extracting the subset of documents from the ranked set of documents based on the selection of the user; and displaying the subset of documents;

generating at least one pair of words contributing to the DSS, wherein the at least one pair of words has the at least one word in the query statement and the at least one word in the respective document in the set of documents; and providing to the user a visualization of the at least one pair of words, and receiving from the user a refinement of the query statement based on the visualization of the at least one pair of words.

8. The computing system of claim 7, wherein the instructions are further configured for ranking at least one of the words in the query statement based on the QES and the words in each respective document in the set of documents based on the DES.

9. The computing system of claim 7, wherein the instructions are further configured for generating a visualization map of words based on at least one of the QES and the DES, wherein the visualization map comprises a correlation of the at least one word in the query statement based on the QES and the at least one word in at least one document of the set of documents based on the DES.

10. The computing system of claim 7, wherein the instructions are further configured for grouping the subset of documents based on the selection of the user.

11. The computing system of claim 7, wherein the instructions are further configured for storing the words corresponding to the QES and the DES based on the selection of the user to provide a stored data, wherein the stored data is used for learning a user interest in context of the query statement.

12. The computing system of claim 7, wherein the instructions are further configured for generating an answer for a question input by the user from the subset of documents.

13. One or more non-transitory computer-readable media comprising:

one or more computer programs including instructions configured for receiving a query statement for retrieving a subset of documents from a set of documents;

processing the query statement by a query encoder to generate a query feature vector (QFV)

determining a document similarity score (DSS) for each document in the set of documents, wherein the DSS is calculated between the QFV and a document feature vector (DFV) of each of the documents in the set of document, and wherein the DFV is generated using a trained neural network;

ranking the set of documents based on the DSS to generate a ranked set of documents;

determining at least one of a query explainability score (QES) and a document explainability score (DES), wherein the QES is determined for each word in the query statement and the DES is determined for each word in each document in the set of documents, wherein the QES DES indicate which words in the query statement and the document has the highest influence on the similarity score;

provisioning a user to select at least one word from at least one from the query statement and the document, wherein the selection of the at least one word is based on at least one of the QES and the DES;

extracting the subset of documents from the ranked set of documents based on the selection of the user; and displaying the subset of documents;

generating at least one pair of words contributing to the DSS, wherein the at least one pair of words has the at least one word in the query statement and the at least one word in the respective document in the set of documents; and providing to the user a visualization of the at least one pair of words, and receiving from the user a refinement of the query statement based on the visualization of the at least one pair of words.

14. The one or more non-transitory computer-readable media of claim 13, wherein the instructions are further configured for: ranking at least one of the words in the query statement based on the QES and the words in each document in the set of documents based on the DES.

15. The one or more non-transitory computer-readable media of claim 13, wherein the instructions are further configured for generating a visualization map of words based on at least one of the QES and the DES, wherein the visualization map comprises a correlation of the at least one word in the query statement based on the QES and the at least one word in at least one document of the set of documents based on the DES.

16. The one or more non-transitory computer-readable media of claim 13, wherein the instructions are further configured for grouping the subset of documents based on the selection of the user.

17. The one or more non-transitory computer-readable media of claim 13, wherein the instructions are further configured for storing the words corresponding to the QES and the DES based on the selection of the user to provide a stored data, wherein the stored data is used for learning a user interest in context of the query statement.

18. The one or more non-transitory computer-readable media of claim 13, wherein the instructions are further configured for generating an answer for a question input by the user from the subset of documents.

* * * * *